United States Patent
Magee

(10) Patent No.: US 9,548,686 B2
(45) Date of Patent: Jan. 17, 2017

(54) ANGLE/FREQUENCY SELECTOR IN AN ELECTRIC MOTOR CONTROLLER ARCHITECTURE

(71) Applicant: Texas Instruments Incorporated, Dallas, TX (US)

(72) Inventor: David Patrick Magee, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 37 days.

(21) Appl. No.: 14/337,576

(22) Filed: Jul. 22, 2014

(65) Prior Publication Data

US 2015/0084575 A1 Mar. 26, 2015

Related U.S. Application Data

(60) Provisional application No. 61/881,714, filed on Sep. 24, 2013.

(51) Int. Cl.
*H02P 6/00* (2016.01)
*H02P 6/18* (2016.01)
*H02P 21/04* (2006.01)

(52) U.S. Cl.
CPC ............ *H02P 6/183* (2013.01); *H02P 6/181* (2013.01); *H02P 21/04* (2013.01); *H02P 21/18* (2016.02)

(58) Field of Classification Search
CPC ......... H02P 21/13; H02P 23/12; H02P 21/146; H02P 23/14; H02P 2203/11; H02P 21/0053; H02P 25/083; G05B 2219/41367; G05B 2219/41387; G05B 2219/41322; G05B 2219/37315

USPC .................................................. 318/400.32
See application file for complete search history.

(56) References Cited

U.S. PATENT DOCUMENTS

| | | | |
|---|---|---|---|
| 5,565,752 A | 10/1996 | Jansen et al. | |
| 7,602,139 B2 | 10/2009 | Ho | |
| 8,217,605 B2 | 7/2012 | Balazovic et al. | |
| 2004/0070360 A1* | 4/2004 | Schulz ................... | B60L 11/18 318/700 |
| 2004/0070362 A1* | 4/2004 | Patel ....................... | H02P 21/00 318/701 |
| 2007/0236167 A1* | 10/2007 | Tomigashi ............... | H02P 6/18 318/721 |
| 2009/0190903 A1* | 7/2009 | Komatsu ................. | B62D 5/046 388/803 |

OTHER PUBLICATIONS

Bhardwaj, "Sensorless Field Oriented Control of 3-Phase Induction Motors Using Control Law Accelerator", Application Report SPRABQ1 (Texas Instruments Incorporated, Oct. 2013).

(Continued)

*Primary Examiner* — Eduardo Colon Santana
*Assistant Examiner* — Bickey Dhakal
(74) *Attorney, Agent, or Firm* — John R. Pessetto; Charles A. Britt; Frank D. Cimino

(57) ABSTRACT

A motor controller architecture and method of operating the same. The motor controller includes a function for estimating the low speed operation of the motor, for example by evaluating the response to a periodic excitation signal injected into the control loop of the controller architecture. Control logic for controlling the motor at transitional speeds between low speed control and high speed (back emf) control is provided in some embodiments.

10 Claims, 8 Drawing Sheets

(56) References Cited

OTHER PUBLICATIONS

Jansen et al., "Transducerless Position and Velocity Estimation in Induction and Salent AC Machines", Trans. on Industry Applications, vol. 31, No. 2 (IEEE, Mar./Apr. 1995), pp. 240-247.
Jang et al., "Analysis of Permanent-Magnet Machine for Sensorless Control Based on High-Frequency Signal Injection", Trans. on Industry Applications, vol. 40, No. 6 (IEEE, Nov./Dec. 2004), pp. 1595-1604.
Park, "Two-Reaction Theory of Synchronous Machines : Generalized Method of Analysis—Part I", Trans. American Institute of Electrical Engineers, vol. 48, Issue 3 (IEEE, 1929), pp. 716-727.
Park, "Two-Reaction Theory of Synchronous Machines : Generalized Method of Analysis—Part I", Electrical Engineering, vol. 52, Issue 1 (IEEE, 1933), pp. 44-45.
U.S. Appl. No. 14/245,206, filed Apr. 4, 2014.
U.S. Appl. No. 14/337,595, filed Jul. 22, 2014.
Kim et al., "Using Low Resolution Position Sensors in Bumpless Position/Speed Estimation Methods for Low Cost PMSM Drives", Industry Applications Conference (IEEE, 2005), pp. 2518-2524.

\* cited by examiner

ANGLE/FREQUENCY SELECTOR IN AN ELECTRIC MOTOR CONTROLLER ARCHITECTURE

CROSS-REFERENCE TO RELATED APPLICATIONS

This application claims priority, under 35 U.S.C. §119(e), of Provisional Application Nos. 61/881,714 and 61/881,730, both filed Sep. 24, 2013, and both incorporated herein by this reference. This application is also a continuation-in-part, under 35 U.S.C. §120, of copending application Ser. No. 14/245,206, filed Apr. 4, 2014, incorporated herein by this reference, which claims priority, under 35 U.S.C. §119(e), of Provisional Application No. 61/819,267, filed May 3, 2013, also incorporated herein by this reference.

STATEMENT REGARDING FEDERALLY SPONSORED RESEARCH OR DEVELOPMENT

Not applicable.

BACKGROUND OF THE INVENTION

This invention is in the field of control systems for electric machines. Embodiments described in this specification are more specifically directed to control of alternating current (AC) electric motors operating at low speed.

Even more than a century after their introduction, AC electric motors continue to enjoy widespread deployment to this day, over a wide range of applications and sizes. AC motors have become especially popular due to their reliability and relatively low cost. Recently, modern high-speed and low-cost programmable microcontrollers have enabled complex motor control algorithms that can now control AC motors to attain increased efficiency in complex commercial, industrial, and consumer equipment and processes. For example, these control algorithms provide the ability to operate AC motors at variable speeds, which in some applications allows for the elimination of complex gears and transmissions in the driven mechanical system. These new control algorithms can also enhance the performance/cost ratio of the motor system, and increase load efficiencies, and maximize the torque per ampere performance of the motor, thus saving significant power.

Field-oriented control ("FOC") has become a common technique in modern motor control systems. According to this approach, the stator windings of the AC motor are driven, for example by pulse-width-modulation, in such a way as to maximize the torque/ampere performance of the motor. For the case of permanent magnet rotors, FOC seeks to drive the field flux vector angle so that the rotor flux angle is 90° out of phase from the field flux, which is at the maximum torque condition.

Field-oriented control of AC motors is complicated because the rotation of the magnetic field in the stator with respect to the rotating magnetic field of the rotor can be asynchronous. As such, AC induction motor operation is characterized by a set of differential equations with time varying coefficients. The well-known "Park" transform, on which many AC motor control algorithms are based, transforms those differential equations into a set of differential equations that have time invariant coefficients. In particular, the Park transform considers motor operation according to a two-dimensional (d, q) coordinate system, where axis d is aligned with the field flux linkage component and orthogonal axis q is aligned with the torque component. By separating the field flux linkage and torque components, the motor torque can be controlled without affecting the field flux, allowing for dynamic torque control, proportional-and-integral (PI) control algorithms, and the like. Typical FOC control loops for AC motors also utilize the well-known Clarke transform to transform the three-phase time variant system of differential equations into a two coordinate time variant system, which the Park transform converts into the (d, q) coordinate system.

As fundamental in the art, closed loop control of AC motors requires knowledge of the current state of the motor, typically including the position and velocity of the rotor. Mechanical transducers, such as encoders and the like, have been used for years to sense the position and velocity of the rotor shaft in conventional electric motors. However, as is well known in the art, these sensors and associated wiring and connectors add significant cost and complexity in the motor and its control system, and are prone to inaccuracy and mechanical failure. To address these concerns, sensorless motor control techniques have been developed in the art. Sensorless induction motor control is commonly implemented by estimating the back electromagnetic force induced in the stator windings by the rotation of the rotor, from which the rotor position and velocity can be determined.

FIG. 1 illustrates a conventional controller architecture for controlling the operation of an AC motor. As well-known in the art and as discussed above, feedback control loops based on the Park transform operate according to reference signals in the direct (d) and quadrature (q) phases, shown in the example of FIG. 1 by reference currents Idref and Iqref, respectively. In the direct phase leg of the loop, error generator $2d$ receives direct phase reference current Idref and a feedback current Id, and forwards error signal $\epsilon d$ corresponding to the difference of those two currents to proportional-integral (PI) controller $4d$. PI controller $4d$ applies error signal $\epsilon d$ to a conventional control function, which in this case is based on a sum of proportional and integral terms involving error signal $\epsilon d$; other control functions may alternatively be used, including PID (proportional-integral-differential) functions and the like. PI controller $4d$ produces direct phase control signal Vd, which is input to inverse Park transform function 6. The quadrature phase leg of this conventional control loop is similarly arranged, with error generator $2q$ receiving quadrature phase reference current Iqref and feedback current Iq, and forwarding error (i.e., difference) signal $\epsilon q$ to proportional-integral (PI) controller $4q$, which in turn applies a conventional control function (e.g., proportional-integral) to produce quadrature phase control signal Vq for input to inverse Park transform function 6. As conventional in the art, inverse Park transform function 6 produces spatially fixed $\alpha$ and $\beta$ phase control signals $V\alpha$, $V\beta$ by transforming the d and q phase control signals. Control signals $V\alpha$, $V\beta$ are in turn applied to conventional space vector/pulse-width modulation (PWM) function 8, which produces three-phase PWM drive signals PWM(a, b, c) at the desired duty cycles and phase timing for motor phases a, b, c, respectively. Three-phase inverter 10 is a conventional power function that drives three stator windings of motor M using DC voltage Vdc, according to PWM drive signals PWM(a, b, c).

The feedback loop in this conventional architecture is based on currents in each of the stator windings, as sensed by conventional current sensors 11 and communicated as current signals Ia, Ib, Ic for the three motor phases. As shown in FIG. 1, current sensors 11 operate to estimate the back emf induced in the stator windings by the rotation of the rotor of motor M; this sensed back emf can be used to determine the position and velocity of the rotor during operation of motor M. These sensed currents Ia, Ib, Ic are typically sampled and digitized, and communicated to Clarke transform function 12 for conversion into spatially fixed α and β phase feedback signals Iα, Ib, which are applied to Park transform function 14 to produce d and q phase feedback signals Id, Iq, respectively. These feedback signals Id, Iq are applied to error generators 2*d*, 2*q*, respectively, as discussed above, closing the control loop. Accordingly, the architecture of FIG. 1 controls the operation of motor M according to the input reference currents Idref and Iqref.

Accurate estimation of rotor position and velocity requires a back emf signal of adequate magnitude and fidelity. Because back emf is proportional to rotor speed, the motor must be operating at a sufficient speed to produce a back emf having an acceptable signal-to-noise ratio. As such, conventional sensorless motor control is not well-suited for low speed control of AC motors. However, certain new AC motor applications require low speed control. For example, washing machine motors must drive an agitation cycle in which the motor operates at low RPM and reverses direction, under heavy load. Variable-speed motor control of this low-speed agitation cycle, and similar cycles, can eliminate the complex gearing and transmission that is otherwise required in modern washing machines. So-called "e-bikes", which are bicycles that include integrated motors to assist in propulsion, provide another application in which low-speed closed loop motor control is desirable, considering that e-bike motors necessarily drive loads at relatively low speeds over significant portions of their operating time.

By way of further background, sensorless initial position detection ("IPD") techniques are known in the art. One class of these technique uses the inherent saliency (i.e., the extent to which induction is dependent on rotor position) of the electric motor to produce a signal from which rotor position may be deduced. These conventional IPD techniques inject a high frequency carrier signal into the stator reference voltage signal. The response of the stator windings to these high frequency components, as reflected in stator feedback current, is then evaluated by a processor in the motor control system to determine the position of the rotor.

By way of further background, Kim et al., "Using Low Resolution Position Sensors in Bumpless Position/Speed Estimation Methods for Low Cost PMSM Drives", *Industry Applications Conference* (IEEE, 2005), pp. 2518-24, describes a motor control architecture in which a low resolution Hall sensor arrangement measures rotor behavior at low speed acceleration, and back emf measures rotor behavior at high speed operation. The Kim et al. article also describes operating a motor according to a "crossover" function, namely a frequency-dependent weighted sum of the Hall sensor and back emf measurements, that produces estimates of rotor position and speed at intermediate frequencies between the low speed and high speed operating regimes.

BRIEF SUMMARY OF THE INVENTION

One or more of the disclosed embodiments provide a controller architecture and corresponding control method capable of accurate and stable control of electric machines, such as an AC electric motor, throughout its entire frequency range from zero speed to its maximum rated speed.

One or more of the disclosed embodiments provide such an architecture and method that can be efficiently implemented into existing control loops in a computationally efficient manner.

One or more of the disclosed embodiments provide such an architecture and method capable of such control based on either or both sensor measurements and sensorless measurements.

One or more of the disclosed embodiments provide such an architecture and method that provides such control with minimal "glitches" and spikes at the motor being controlled.

Other objects and advantages of the disclosed embodiments will be apparent to those of ordinary skill in the art having reference to the following specification together with its drawings.

According to certain embodiments, a control architecture for an electric machine, and a corresponding control method, may be implemented by the combination of a high speed estimator and a low speed estimator, each of which generate estimates of rotor position and speed (i.e., frequency). An angle/selector function applies estimates from the low speed estimator to the control loop at speeds below a first threshold motor speed, and applies estimates from the high speed estimator at speeds above a second, higher, motor speed. For intermediate frequencies between the first and second thresholds, the angle/frequency selector selects the estimates of one or the other of the low and high speed estimates according to a sequential logic algorithm that is responsive to previous operational states of the motor and the control loop. The low speed and high speed estimator functions may operate in response to either or both of sensorless signal inputs and encoded sensor signals.

DETAILED DESCRIPTION OF THE INVENTION

The one or more embodiments described in this specification are implemented into a control system for an AC induction motor, as it is contemplated that such implementation is particularly advantageous in that context. However, it is also contemplated that concepts of this invention may be beneficially applied to in other applications, for example other types of AC and DC motors, including permanent magnet (PM) motors, and other AC and DC electric machines. Accordingly, it is to be understood that the following description is provided by way of example only, and is not intended to limit the true scope of this invention as claimed.

Figure 2:
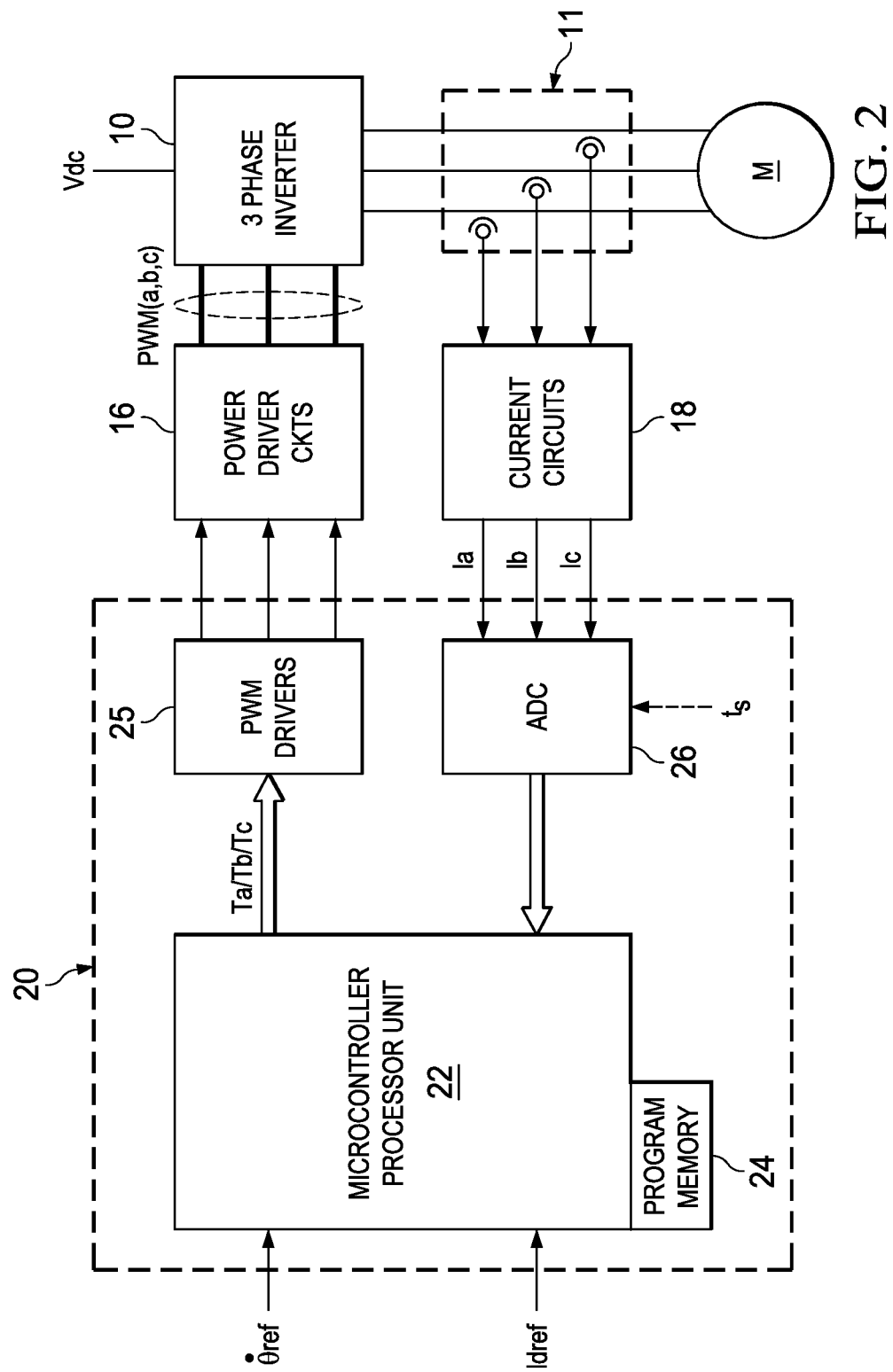
FIG. 2 is a block diagram of a motor controller architecture according to an embodiment.

FIG. 2 illustrates, in the form of a block diagram, an example of a field-oriented control (FOC) control system for an electric machine, according to an embodiment. In the example of FIG. 2, the electric machine under control of this system is AC induction motor M, which has three stator windings arranged 120° out of phase relative to one another in the conventional manner. As will be apparent to those skilled in the art having reference to this specification, other types of motors and other electric machines may be controlled according to the disclosed embodiments, including PM motors, DC motors, and the like; further in the alternative according to the disclosed embodiments, other types of control algorithms including scalar control techniques may be implemented in place of the vector, or FOC, control algorithm.

As shown in FIG. 2, much of the control architecture is implemented by programmable microcontroller integrated circuit (MCU) 20. This implementation enables many of the calculations and control loop functions to be carried out in the digital domain. Examples of integrated circuits suitable for use as MCU 20 according to these embodiments include microcontrollers in the C2000 and MSP430 families available from Texas Instruments Incorporated. In the example of FIG. 2, MCU 20 includes microcontroller processor unit 22, which receives direct phase reference current signal Idref and motor speed input signal θref from external to MCU 20, along with feedback signals from motor M as will be described below. Processor unit 22 is coupled to program memory 24, which stores program instructions for retrieval and execution by processor unit 22 upon the received reference and feedback signals; according to this embodiment, the program instructions stored in program memory 24 cause processor unit 22 to perform the various control functions described in this specification. The result of this program execution by processor unit 22 are three-phase data signals Ta, Tb, Tc that are indicative of the pulse-width-modulation duty cycles at which the three phases (i.e., phases a, b, c, respectively) of motor M are to be driven. Data signals Ta, Tb, Tc are applied to PWM drivers 25 in MCU 20, which in turn generates the appropriate control signals that are applied to power driver circuits 16, which in turn generates the corresponding pulse-width-modulated pulses on lines PWM(a, b, c), at the appropriate frequency and phase, that drive three-phase inverter 10 and thus motor M.

The feedback side of the control system of FIG. 2 includes current sensors 11 that are disposed at motor M, and that in this example sense electrical conditions at each of the stators of motor M. As will be evident in the following description for this embodiment, these electrical conditions correspond to the measured current in the stator windings of motor M, or a voltage indicative of the inductance of stator windings as a function of rotor position or rotor angle (the terms "rotor position" and "rotor angle" are used synonymously in this description). These sensed electrical parameters are, in this example, communicated to current circuits 18, which are conventional analog circuits for generating current signals Ia, Ib, Ic for respective phases a, b, c of motor M. Current signals Ia, Ib, Ic are forwarded to analog-to-digital-converters (ADCs) 26 in MCU 20, for sampling (at the frequency of sample clock $t_s$) and conversion to digital data values. Those digital sample values are then applied to processor unit 22 for processing according to the control algorithm expressed in program instructions stored in program memory 24, described in further detail below, responsive to which the drive signals to be applied to motor M are generated.

In the example of FIG. 2, PWM drivers 25 and ADCs 26 are implemented within MCU 20, i.e. in the same integrated circuit as processor unit 22. This integration of PWM drivers 25 and ADCs 26 thus follows the architecture of the C2000 MCUs noted above. Alternatively, PWM drivers 25 and ADCs 26 may be implemented "off-chip" relative to processor unit 22, as known in the art. Additionally, the example of FIG. 2 illustrates program memory 24 as also integrated into the same integrated circuit as processor unit 22; alternatively, program memory 24 may of course be implemented in a separate integrated circuit if desired. In any case, it is contemplated that such other functions and interfaces of MCU 20, beyond those shown in FIG. 2, will be realized as known in the art, for example with the C2000 and MSP430 MCU architectures noted above.

Further in the alternative, the functions of MCU 20 may be realized in other architectures, and are not necessarily implemented by a programmable logic device. It is contemplated that those skilled in the art having reference to this specification will be readily able to implement the controller functions described herein according to the circuitry desired for particular implementations.

Figure 1:
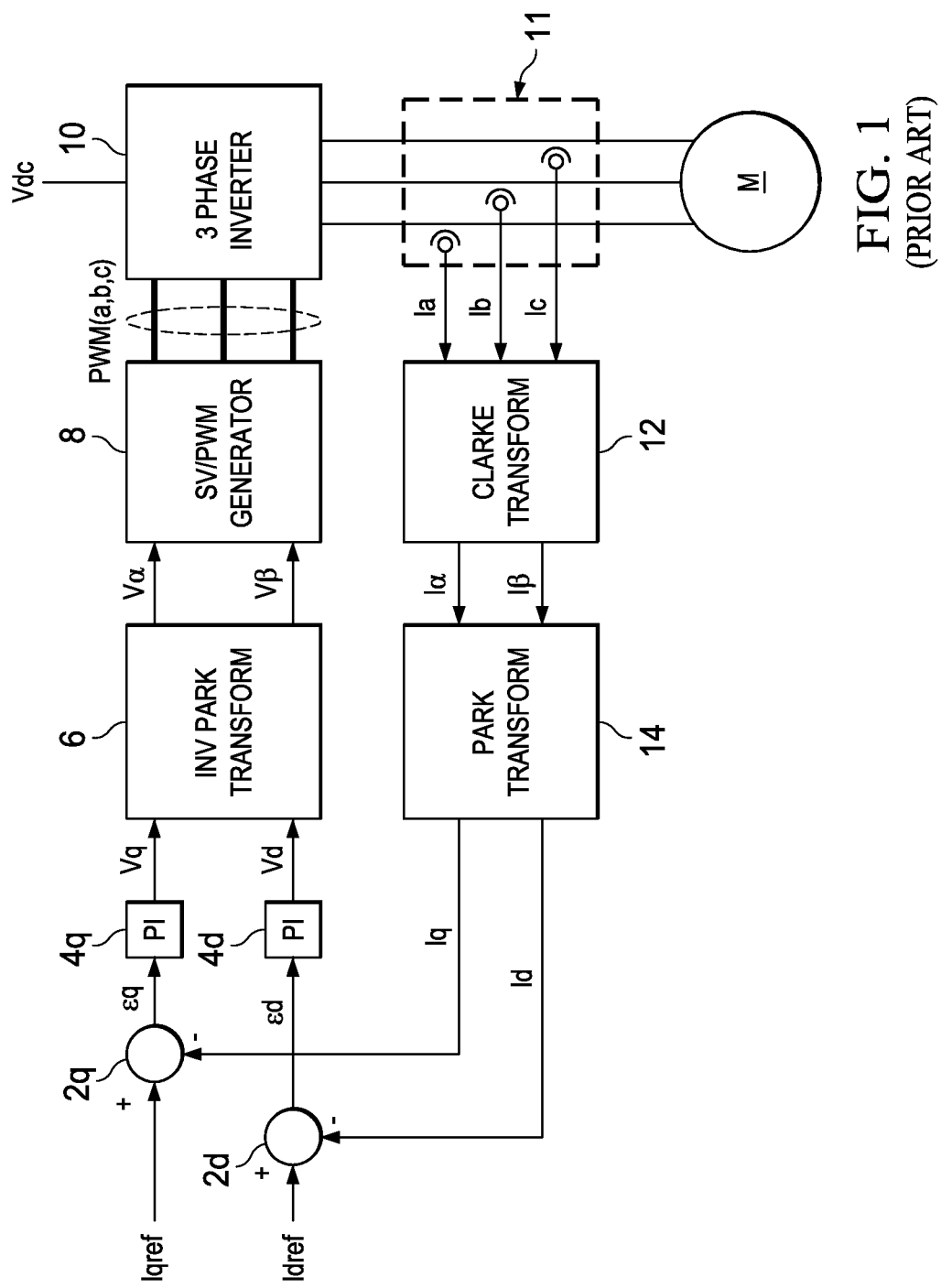
FIG. 1 is a functional block diagram of a conventional motor controller architecture.
Figure 3:
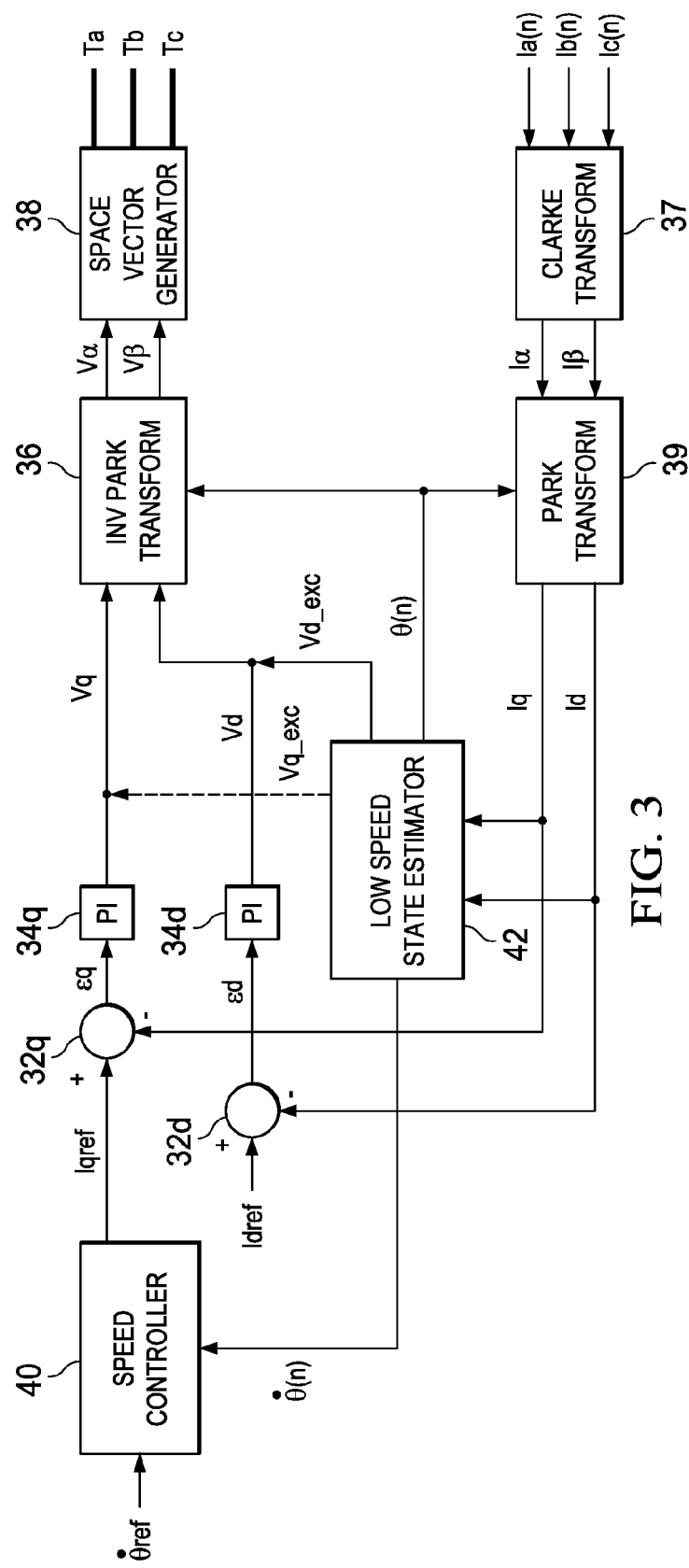
FIG. 3 is a functional block diagram of a digital portion of a microcontroller architecture for motor control according to the embodiment of FIG. 2.

FIG. 3 illustrates the functional architecture of a field-oriented control (FOC) motor control system as may be implemented in the hardware architecture of FIG. 2 according to an embodiment, as will now be described. The architecture of FIG. 3 is in part similar to the conventional field oriented control (FOC) architecture discussed above relative to FIG. 1. In the FOC context, error generator 32d receives direct phase reference current Idref and feedback current Id, and forwards error signal εd corresponding to the difference of those two currents to proportional-integral (PI) controller 34d. PI controller 34d in turn applies a conventional control function, for example a combination of proportional and integral functions, to error signal εd to produce direct phase control signal Vd for application to inverse Park transform function 36. For the quadrature phase, error generator 32q receives quadrature phase reference current Iqref (generated by speed controller 40 as described below) and feedback current Iq, and applies a corresponding error signal εq to proportional-integral (PI) controller 34q, which in turn applies a conventional control function (e.g., proportional-integral) to produce quadrature phase control signal Vq for application to inverse Park transform function 36. As discussed above, other control functions may alternatively be implemented in controllers 34d, 34q, for example PID control (i.e., proportional, integral, and differential terms). Inverse Park transform function 36 transforms the d and q phase control signals Vd, Vq to spatially fixed α and β phase control signals Vα, Vβ, and applies those signals to space vector generator 38, which produces three-phase data signals Ta, Tb, Tc applied to PWM drivers 25 (FIG. 2). Data signals Ta, Tb, Tc, from space vector generator 38 express duty cycles (i.e., pulse widths) for their corresponding phases, and are converted by PWM driver into pulses applied to the stator windings of motor M.

The feedback side of the control loop in this architecture receives sensed current sample streams Ia(n), Ib(n), Ic(n), associated with the three motor phases, as produced by ADCs 26 based on the electrical parameters sensed by sensors 11 (FIG. 2) and communicated via current circuits 18. These sample streams Ia(n), Ib(n), Ic(n) represent currents induced in the stator windings by the rotor of motor M as it rotates, from which back emfs in those windings can be determined, reflecting the motor operating speed. Sample streams Ia(n), Ib(n), Ic(n) are applied to Clarke transform function 37 for conversion into spatially fixed α and β phase feedback signals Iα, Iβ, which in turn are applied to Park transform function 39 to produce d and q phase feedback signals Id, Iq, respectively. These feedback signals Id, Iq are applied to error generators 32d, 32q, respectively, as discussed above.

The portion of the control architecture of FIG. 3 described so far accomplishes the control function when motor M is operating at relatively high-speeds, specifically at a rotational speed or frequency sufficient to generate an adequate back emf signal at sensors 11 (FIG. 2). As discussed above, the back emf signals are not sufficiently strong (i.e., have a sufficient signal-to-noise ratio) at low speed operation to accurately indicate the speed of the rotor of motor M.

According to the disclosed embodiments, the functional architecture of FIG. 3 implements the capability of attaining low-speed control, so that motor M can be accurately controlled at rotational speeds down to zero RPM, and under operating conditions in which the direction of rotation changes (i.e., "through" zero RPM), such as in the agitation cycle of a washing machine. According to the functional architecture of FIG. 3, which in the example of FIG. 2 is implemented in processor unit 22 under the control of program instructions stored in program memory 24, this low speed control function is performed by the functions of speed controller 40 and low speed state estimator 42.

According to this embodiment, speed controller function 40 implements a control function that receives motor speed input signal $\dot{\theta}$ref from external to MCU 20, and velocity estimate signal $\dot{\theta}$(n) from low speed state estimator 42. The particular control function implemented by speed controller 40 may be a proportional-integral control function applied to a difference (i.e., error signal) between motor speed input signal $\dot{\theta}$ref and velocity estimate signal $\dot{\theta}$(n), or such other control function as may be used. Based on its control function and the speed input signal $\dot{\theta}$ref and velocity estimate signal $\dot{\theta}$(n), speed controller 40 generates quadrature phase reference current signal Iqref that is applied to error generator 32q, from which error signal εq is produced.

Low speed state estimator 42 carries out an initial position detection (IPD) function, in which the response of motor M to an excitation signal is analyzed to determine its instantaneous position. As described in copending and commonly assigned application Ser. No. 14/245,206, filed Apr. 4, 2014 and incorporated herein by this reference, measurement of the response of motor M to a high-frequency signal injected into the pulse-width-modulated drive signals can provide an indication of rotor position and velocity, even at low speed or when stopped. This technique is based on the salience (i.e., position-dependent induction) of the motor, for example as may be due to spatially-variant reluctance of the motor, or spatial variations of gap spacing between the stators and the rotor. Knowledge of the excitation waveform and these characteristics of the motor enables the response of the motor to the high-frequency excitation signal to yield position information.

Low speed state estimator 42 in this architecture implements the IPD function by generating an excitation signal Vd_exc that modulates the d phase control signal Vd from controller 34d, prior to its application to inverse Park transform function 36. When implemented in the digital domain, such as in the architecture of FIG. 2, the excitation signal Vd_exc is in the appropriate digital form as to insert a signal of the desired magnitude along with the d phase control signal Vd when pulse-width modulated by space vector generator 38 and PWM drivers 26. It is contemplated that the frequency of the pulse-width-modulated signal component indicated by excitation signal Vd_exc will be significantly higher (e.g., at least an order of magnitude greater) than the frequency reflected by d phase control signal Vd (i.e., the field flux frequency applied by the stator windings of motor M), and at a much lower amplitude (e.g., two orders of magnitude lower). While the example of FIG. 3 shows excitation signal Vd_exc as applied to d phase control signal Vd, an excitation signal Vq_exc may alternatively, or additionally, be applied to q phase control signal Vd, as suggested by the dashed line in FIG. 3. And while excitation signals Vd_exc, Vq_exc are expressed as voltages in this example, the injected excitation signals may alternatively be implemented as current components.

These high frequency excitation signals Vd_exc, Vq_exc that are transformed and injected into the pulse-width-modulated drive signals PWM(a,b,c) induce a response by motor M that can be sensed from sensors 11, and from which the instantaneous position of the rotor can be deduced based on the position-dependent inductance of the rotor of motor M. This response is communicated to low speed state estimator 42 as components of d and q phase feedback signals Id, Iq generated by Park transform 39 (via ADCs 26 and Clarke transform 37) from those sensed response signals, which in turn recovers estimates of rotor angle and rotor velocity, according to these embodiments.

In the digital implementation example discussed above relative to FIG. 2, low speed state estimator 42 constitutes a software function performed by processor unit 22 executing corresponding program instructions stored in program memory 24, to perform the appropriate operations on the d and q phase feedback signals Id, Iq to recover an rotor angle estimate signal stream θ(n) and an rotor velocity estimate signal stream $\dot{\theta}$(n), both signal streams continuing over time as additional samples are acquired and processed.

As described in the above-incorporated copending application Ser. No. 14/245,206, low speed state estimator 42 may be implemented as a "Luenberger observer" which, as known in the art, corresponds to a system that operates to iteratively reduce an angle estimate θ to match the rotor angle $θ_R$, thus recovering current values of rotor angle estimate θ(n) and rotor velocity estimate $\dot{\theta}$(n). Alternatively, as mentioned in copending application Ser. No. 14/245,206, other approaches may be used for determining rotor angle estimate θ(n) and rotor velocity estimate $\dot{\theta}$(n), including more computationally intensive calculations (which may require additional knowledge regarding the inductance variation of motor M).

The rotor angle estimate θ(n) sample stream generated by low speed state estimator 42 is applied to inverse Park transform function 36 for its use in generating spatially fixed α and β phase control signals Vα, Vb, and are also applied to Park transform function 39 for its use in generating spatially fixed α and β phase feedback signals Iα, Ib. Rotor velocity estimate $\dot{\theta}$(n) is applied to speed controller 40, as shown in FIG. 3 and discussed above, for application to its control function and the generation of quadrature phase reference current Iqref that is applied to error generator 32q, from which the torque component of the PWM drive signals are generated.

Figure 4:
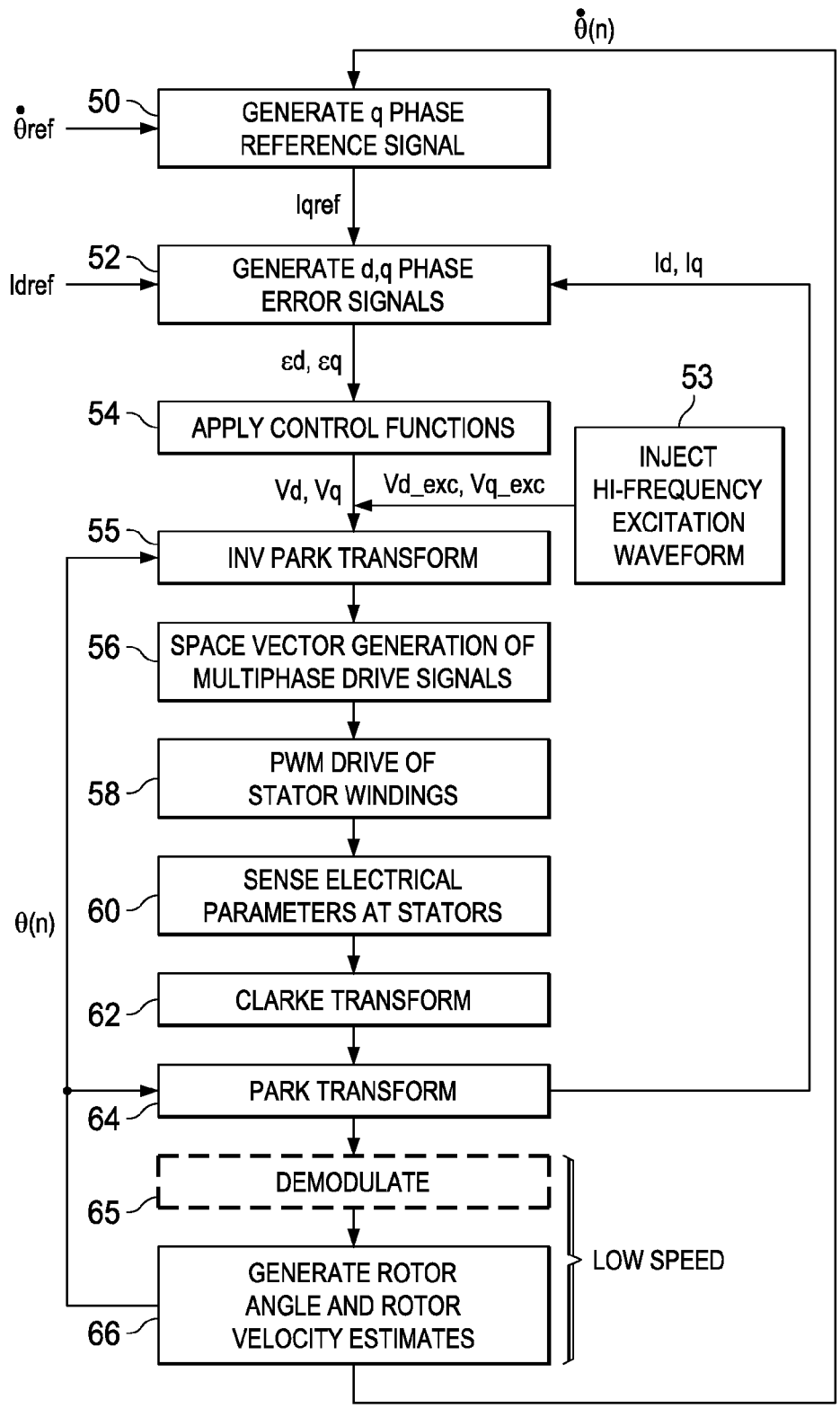
FIG. 4 is a flow diagram illustrating an example of the operation of the architecture of the embodiments of FIGS. 2 and 3.

FIG. 4 illustrates the operation of the motor control architecture of FIGS. 2 and 3, by way of a generalized flow diagram. As discussed above, when carried out in the digital domain by processor unit 22, it is contemplated that this motor control process will be performed in a discrete time manner, based on sample streams representative of the various input, control, and feedback signals. Alternatively, this motor control process may be carried out, in part or in whole, in the analog domain to the extent that this architecture is implemented by analog circuitry.

In process 50, speed controller 40 generates quadrature phase reference current Iqref from a received motor speed input signal θref, which may correspond to an input from a user of a machine in which motor M is implemented, or to the output of a control function (e.g., another microcontroller unit) that determines the desired speed at which motor M is to be driven. Under low speed operation, as will be discussed below, speed controller 40 also receives and responds to velocity estimate signal $\dot{\theta}(n)$, in its generation of quadrature phase reference current Iqref.

In process 52, direct phase feedback signal Id is subtracted from direct phase reference current Idref by error generator 32d, and quadrature phase feedback signal Iq is subtracted from quadrature phase reference current Iqref by error generator 32q, to produce corresponding direct and quadrature phase error signals εd, εq, respectively. As fundamental in the control systems art, these direct and quadrature phase error signals εd, εq reflect the differences, for the field flux and torque components, between the desired and current operating conditions of motor M. Control functions are applied to these error signals εd, εq in process 54, by PI controllers 34d, 34q of FIG. 3, to produce control voltages Vd, Vq. The control functions applied in process 54 amount to the desired filtering and other shaping appropriate for the control loop, as known in the art.

According to these embodiments, a high-frequency excitation signal is injected into either or both of control voltages Vd, Vq in process 53; alternatively, if the control loop is implemented with reference to current signals, the excitation signals injected in process 53 may be expressed as currents. Considering that the quadrature phase control voltage signal Vq is reflective of the desired adjustment in the torque component of the applied electric field, it is contemplated that the excitation signal will typically be applied only to direct phase control voltage Vd; as noted above, the excitation signals may alternatively be quadrature phase-only or complex, if desired. As also noted above, the frequency indicated by excitation signals Vd_exc, Vq_exc will be significantly higher than the frequency reflected by d phase control signal Vd (i.e., the field flux frequency applied by the stator windings of motor M), and at a much lower amplitude. In particular, it is desired that the injected excitation signal not have a significant component or harmonic within the bandwidth of the motor drive; rather, excitation signals Vd_exc, Vq_exc should be at a sufficiently high frequency as to not affect the physical operation of motor M, preferably with significant separation between the bandwidth of the excitation and drive signals.

In any case, according to these embodiments, excitation signals Vd_exc, Vq_exc are injected into the reference frame that is aligned with the magnetic field of the rotor. For the case of a permanent magnet (PM) motor, the magnetic field of the rotor and the magnetic field of the stator are synchronous with one another and constitute the synchronous frame into which the excitation signals Vd_exc, Vq_exc are injected. For AC induction motors, the magnetic field of the rotor and the magnetic field of the stator are slightly misaligned due to the slip needed to induce the magnetic field in the rotor. As a result, the (d, q) frame, into which excitation signals Vd_exc, Vq_exc are injected, is aligned with the induced magnetic field of the rotor.

The excitation signals Vd_exc, Vq_exc injected by process 53 may express any one of a number of various waveform shapes. For example, excitation signals Vd_exc, Vq_exc may correspond to sinusoids at the desired frequency and amplitude. However, it has been discovered that the waveform shape can affect the calculations required of low speed state estimator 42 to derive the rotor angle estimate θ(n) and rotor velocity estimate $\dot{\theta}(n)$. For example, sinusoidal excitation signals Vd_exc, Vq_exc require low speed state estimator 42 to demodulate the feedback signals in order to recover rotor angle and velocity. Therefore, according to some embodiments and as described in copending application Ser. No. 14/245,206, excitation signals Vd_exc, Vq_exc are in the form of square waves, which eliminates the need for demodulation at low speed state estimator 42. In addition, because demodulation of the response signals is avoided by injecting square wave excitation signals, low speed state estimator 42 can execute at much higher clock rates than if demodulation were required. This higher execution rate of low speed state estimator 42 in turn allows excitation signals Vd_exc, Vq_exc to be at higher frequencies yet, including at frequencies outside of the human-audible range. Especially for consumer equipment such as washing machines and e-bikes, this allows the injection of excitation signals Vd_exc, Vq_exc to not be audible to the user.

Control signals Vd, Vq, after modification by the injection of excitation signals Vd_exc, Vq_exc, respectively, are then transformed into the α-β reference frame by inverse Park transform function 36 in process 55, and applied to space vector generator function 38 for the generation of three-phase data signals Ta, Tb, Tc in process 56. PWM drivers 26, power driver circuits 16, and three-phase inverter 10 drive the stator windings of motor M with pulse-width-modulated pulses according to the duty cycles indicated by data signals Ta, Tb, Tc, in process 58, causing rotation of the rotor in motor M according to the control signals.

The feedback loop of the motor control process of FIG. 4 is carried out based on the sensing of electrical parameters, namely voltages or currents in the stator windings, by sensors 11 in process 60. As known in the art, these sensed parameters are indicative of the back emf induced by rotation of the rotor, at least at relatively high rotational speeds; according to these embodiments, these sensed parameters also reflect position-dependent variances in inductance in response to excitation signals Vd_exc, Vq_exc injected in process 53. In any case, in the example of FIGS. 2 and 3, the sensed parameters are converted to currents and sampled by ADCs 26, also in process 60. In process 62, the sample stream of sensed currents are subjected to a Clarke transform by function 37, and the result subjected to a Park transform by function 39 in process 64 to produce feedback signals Id, Iq in the direct and quadrature phases, respectively. These feedback signals Id, Iq are applied as inputs to error signal process 54, at error generators 32d, 32q, for use in field-oriented control of motor M at high speeds.

According to this embodiment, low speed control is carried out by low speed state estimator function 42, in processes 65 and 66. If excitation signals Vd_exc, Vq_exc are sinusoids or other waveforms that necessitate demodulation in the feedback loop, demodulation process 65 is performed by low speed state estimator 42 to recover the responses to those excitation signals Vd_exc, Vq_exc. However, as noted above, excitation signals Vd_exc, Vq_exc in the form of square waves may be analyzed without demodulation at low speed state estimator 42.

Either after demodulation process 65 or if demodulation is not required, low speed state estimator 42 then generates new values of rotor angle estimate θ(n) and rotor velocity estimate θ̇(n) in process 66, according to the particular IPD algorithm implemented by low speed state estimator. As discussed above and as described in the above-incorporated copending application Ser. No. 14/245,206, process 66 may be implemented by way of a "Luenberger observer" algorithm executed by low speed state estimator 42. The rotor angle estimate θ(n) recovered in process 66 is applied as an input to Park transform processes 55, 64, and the rotor velocity estimate θ̇(n) recovered in process 66 is applied as an input to process 50 to generate quadrature phase reference signal Iqref, as discussed above. Upon receipt of those new estimates from this instance of process 66, the control loop process begins again with process 50, generating new control signals, driving motor M over the next interval, with the response sampled and fed back as described above.

According to these disclosed embodiments, the injection of excitation signals Vd_exc, Vq_exc and the measurement of the response of motor M to that excitation is used to effect control of motor M at low speeds, namely those at which the back emf signal is not of adequate strength or fidelity to properly control the motor. Because this low speed control is based on an injected excitation signal, the estimates of rotor position and velocity do not depend on the speed of the motor. This allows the low speed control approach of these embodiments to be used to and through zero RPM speeds, including controlling motor M as it reverses direction. In addition, as discussed above, use of a square wave excitation signal eliminates the need for demodulation of the sensed response, allowing the position and velocity estimation to operate at much higher clock rates, which in turn enables the excitation signal to be at frequencies beyond those audible to humans.

The process described above relative to FIG. 4, including the low speed control loop, may be applied to motor M over all operating speeds. However, it is contemplated that the field-oriented control (FOC) will be inaccurate at low speeds because of the poor back emf signal, as discussed above. Conversely, it is contemplated that the low speed control loop based on the injected excitation signal will generally be unnecessary at higher speeds for which the back emf signal is adequate; in addition, it is contemplated that the excitation signal itself may interfere with the operation of motor M as the rotor speed approaches frequencies near that of the excitation signal, in which case the excitation signal can affect the motor drive signals. As such, it is contemplated that MCU 20 will include the appropriate circuitry or program instructions to cause its operation to disable the low speed control loop (i.e., low speed state estimator 42, and processes 53 and 66) upon sensing a motor speed above a certain limit (e.g., some f_min at about 30 Hz), at which point conventional FOC will take over control. Conversely, MCU 20 may also include the appropriate circuitry or program instructions to cause its operation to disable the FOC control loop (i.e., response of error generators 32d, 32q to feedback currents Id, Iq in process 52, or selection of a different control function in process 54 at PI controllers 34d, 34q) upon sensing a motor speed below that limit (e.g., some f_min at about 30 Hz), in which the low speed control loop via low speed state estimator 42 will control motor M.

It is contemplated that the switching of control from FOC to low speed control on either side of a selected f_min for motor M can be readily implemented by those skilled in the art having reference to this specification, and that this simple switch of control functions can be adequate in some implementations. However, it is contemplated that it may be advantageous to effect smooth and continuous control of the operation of motor M over the entire range of its operating speeds (i.e., frequencies). According to another embodiment, MCU 20 of FIG. 2 includes a control function that manages the transition between control algorithms, as will now be described relative to FIGS. 5 through 9.

Figure 5:
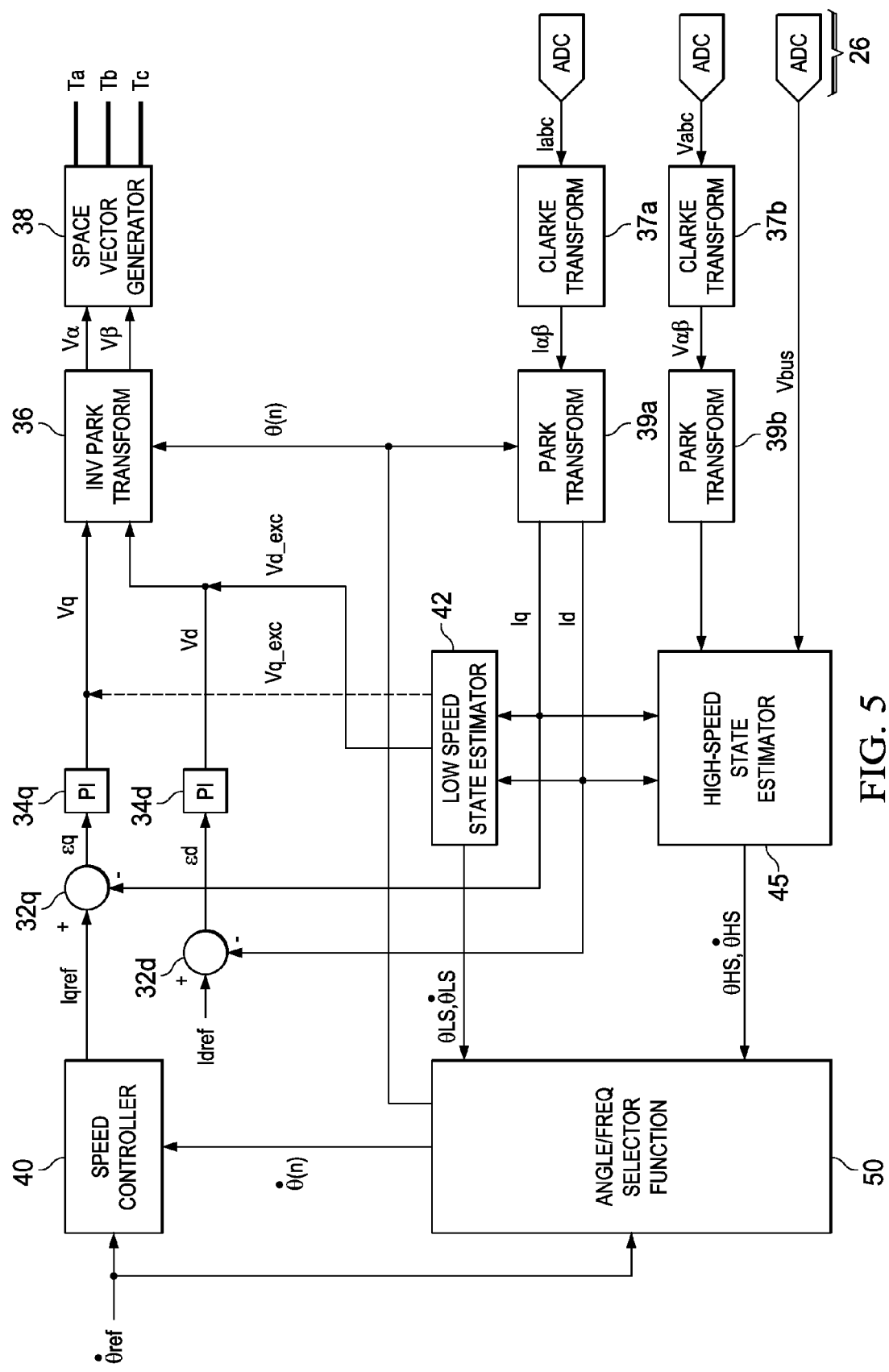
FIG. 5 is a functional block diagram of a digital portion of a microcontroller architecture for motor control according to another embodiment.

FIG. 5 illustrates the functional architecture of such a field-oriented control (FOC) motor control system, as may be implemented in the hardware architecture of FIG. 2, according to an embodiment that includes the control function for managing the transition between control algorithms. Those functions and signals in the architecture of FIG. 5 that are identical to functions in the architecture of FIG. 3 are indicated by the same reference numerals and signal names as described above relative to FIG. 3.

The architecture of FIG. 5 includes multiple sources of feedback signals into the control system. One source of feedback signals is the set of current sample streams Iabc (corresponding to current sample streams Ia(n), Ib(n), k(n) of FIG. 3), which are produced by ADCs 26 and represent currents induced in the stator windings by the rotor of motor M as it rotates. These current sample streams Iabc are input to Clarke transform function 37a to produce spatially fixed α and β phase feedback signals Iαβ that are in turn input to Park transform function 39a, which in turn produces direct and quadrature phase feedback currents Id, Iq, respectively. In this embodiment as shown in FIG. 5, the direct and quadrature phase feedback currents Id, Iq, are input to error generators 32d, 32q, respectively. Another feedback signal source are voltage sample streams Vabc (representing three sample streams) corresponding to voltages sensed at each of the stator windings, and digitized by ADCs 26. These voltage sample streams Vabc are input to Clarke transform function 37b to produce spatially fixed α and β phase feedback signals Vαβ that are in turn input to Park transform function 39b, which produces direct and quadrature phase signal components Vdq representative of the sensed voltages. Also in the architecture of FIG. 5, an ADC 26 receives a signal from the voltage supply source, and produces voltage sample stream Vbus corresponding to the voltage level of the reference bus.

In the architecture of FIG. 5, the particular feedback signal or signals involved in the control loop may be any of these current, voltage, and Vbus signals, or alternatively may be some combination of those signals, if available in the particular implementation. The functional architecture of FIG. 5 also includes high-speed state estimator 45, which receives direct and quadrature phase feedback currents Id, Iq, as well as direct and quadrature phase signal components Vdq from Park transform 39b, and the Vbus voltage. It is contemplated that any one of these three types of feedback signals (i.e., current, voltage, Vbus) will be sufficient for performing the motor control function of this embodiment; alternatively, a combination of two or more of those three feedback signal types may be used in the operation of high-speed state estimator function 45, depending on their availability in the particular implementation and on the desired control algorithm.

In a hardware architecture such as shown in FIG. 2, high-speed state estimator 45 constitutes a software function performed by processor unit 22 executing corresponding program instructions stored in program memory 24, to perform the appropriate operations on one or more of the current, voltage, and Vbus feedback signals to recover an rotor angle estimate signal stream θ(n) and an rotor velocity estimate signal stream θ̇(n), both continuing over time as additional samples are acquired and processed. In contrast to low-speed state estimator function 42, which as described above recovers estimates of rotor angle and rotor velocity from the response of motor M to an injected excitation signal Vd_exc or Vq_exc as suitable for low-speed operation, high-speed state estimator 45 determines rotor angle and velocity according to a technique suitable for high-speed use, such as the back emf induced in the stator windings of motor M by rotation of the rotor. As described above, high-speed estimates such as that produced by high-speed state estimator 45 are typically not accurate at low motor speeds, as the amplitude of the back emf at the motor windings is not sufficiently strong or stable for use in the control of the motor. Accordingly, for purposes of this description, it will be assumed that the rotor angle and velocity estimates produced by high-speed state estimator 45 will be accurate at high motor speeds but less so at low motor speeds, and that the use of low-speed state estimator 42 to produce rotor angle and velocity estimates will be desirable at low motor speeds but less so at high motor speeds.

Control of the transition between use of the estimates produced by low-speed state estimator 42 and high-speed state estimator 45 is managed, in this embodiment, by angle/frequency selector function 50. Angle/frequency selector function 50 corresponds to a logic function that receives a rotor angle estimate θLS and a rotor velocity estimate θ̇LS from low-speed state estimator 42, a rotor angle estimate θHS and rotor velocity estimate θ̇HS from high-speed state estimator 45, and also the motor speed input signal θ̇ref that is also applied to speed controller 40. In the arrangement of FIG. 5, angle/frequency selector function 50 applies these inputs to a logic function to determine which pair of estimates, namely low-speed estimates θLS and θ̇LS or high-speed estimates θHS and θ̇HS, are to be forwarded as rotor angle estimate θ(n) to the forward and inverse Park transforms 36, 39, and as rotor velocity estimate θ̇(n) to speed controller 40, respectively.

Figure 6:
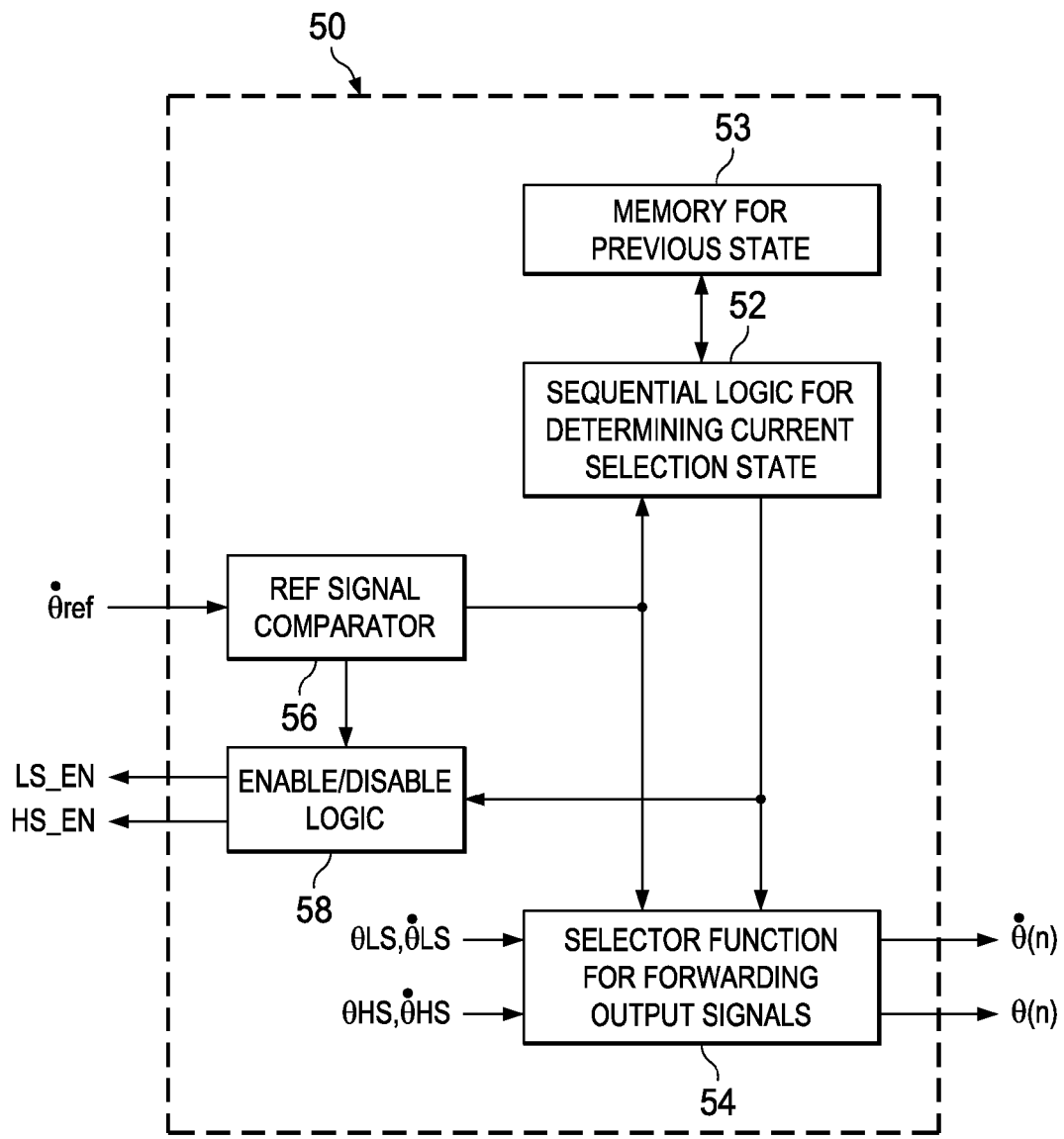
FIG. 6 is a functional block diagram of the angle/frequency selector in the architecture of FIG. 5 according to that embodiment.

In a hardware architecture such as shown in FIG. 2, angle/frequency selector function 50 constitutes a software function performed by processor unit 22 executing corresponding program instructions, stored in program memory 24, to perform the appropriate operations involved in its operation as described herein. By way of further explanation, FIG. 6 is a functional block diagram illustrating functions within angle/frequency selector function 50 that carry out this operation, according to one embodiment. Of course, those skilled in the art having reference to this specification will be readily able to arrange the construction and functions of angle/frequency selector function 50 in such alternative ways as useful and beneficial for particular implementations, with such alternatives contemplated to be within the scope of the claims below.

In the example of the arrangement of FIG. 6, angle/frequency selector function 50 operates in the manner of a state machine, as implemented by sequential logic function 52. Sequential logic function 52 determines a current selection state that defines the state of operation of the motor controller, in response to which selector function 54 selects either low-speed estimates θLS and θ̇LS or high-speed estimates θHS and θ̇HS to be forwarded as rotor angle estimate θ(n) and rotor velocity estimate θ̇(n). According to this embodiment, the available selection states of sequential logic function 52 are:
  "idle";
  low-speed ("LS");
  high-speed ("HS");
  "transition".

As will become apparent below, the "transition" state refers to a state of transition between the low-speed (LS) state and the high-speed (HS) state, in either direction. In some implementations, it may be desirable to have separate "transition" states for the LS-to-HS and HS-to-LS transition, particularly if the selection made by selector function 54 is to differ according to the direction of the transition. The operation of sequential logic function 52 to determine the current selection state depends upon the previous state of operation, shown in FIG. 6 as stored in previous state memory 53, and also on a signal from reference signal comparator which compares the motor speed input signal θ̇ref with certain threshold levels, as will be described in further detail below. In this example, enable/disable logic 58 issues enable signal LS_EN to selectively enable and disable low-speed state estimator 42, and enable signal HS_EN to selectively enable and disable high-speed state estimator 45, both in response to the current selection state as determined by sequential logic 52 and to the results of the comparisons determined by reference signal comparator 56. Signal comparator 56 may include memory locations or registers that store the various thresholds against which it compares motor speed input signal θ̇ref, as will be described below. Other control logic as appropriate to carry out the operation of angle/frequency selector function 50 described below will also be included, as will be apparent to those skilled in the art having reference to this description.

Figure 7:
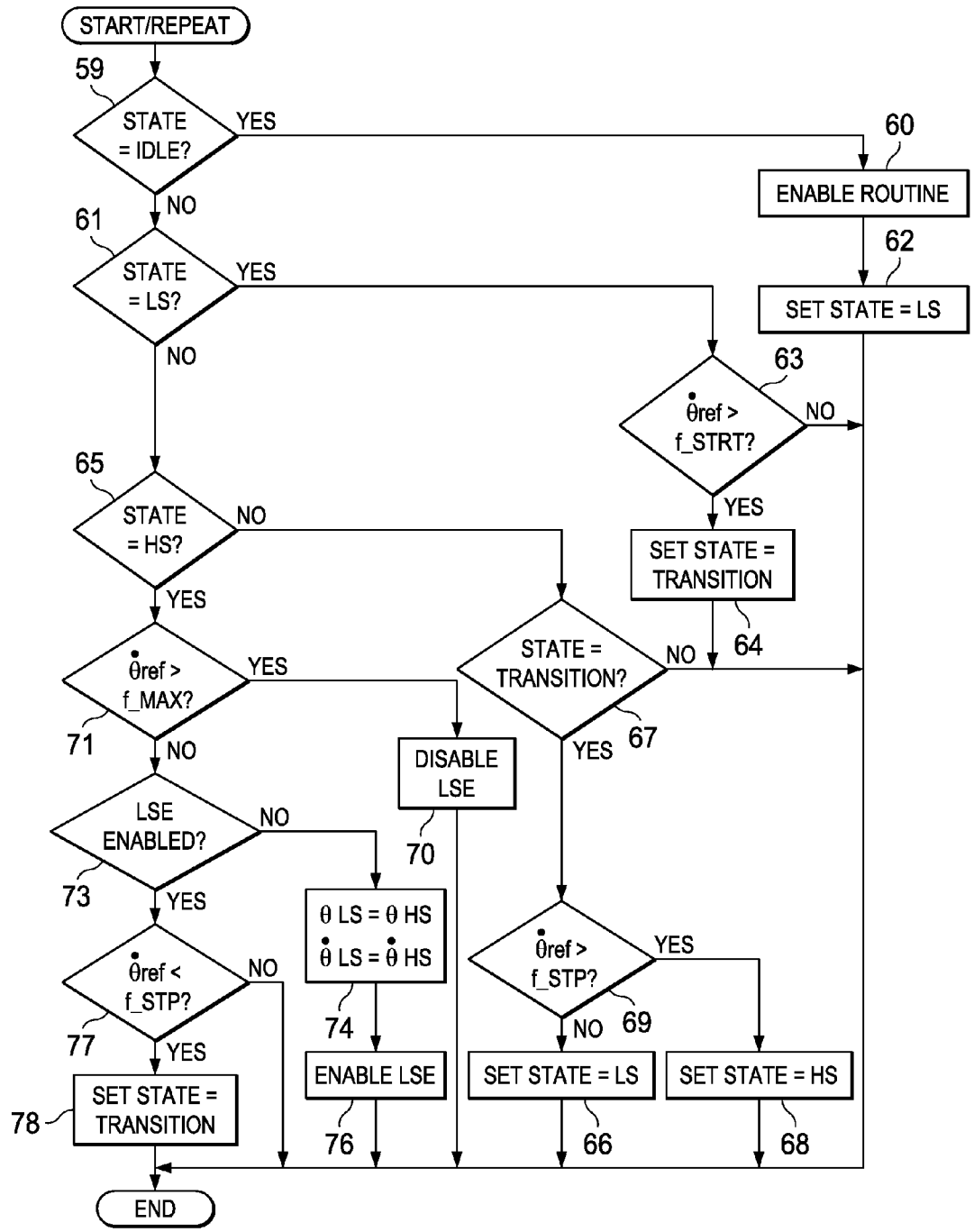
FIGS. 7 and 8 are flow diagrams illustrating an example of the operation of the architecture of the embodiment of FIGS. 5 and 6.
Figure 8:
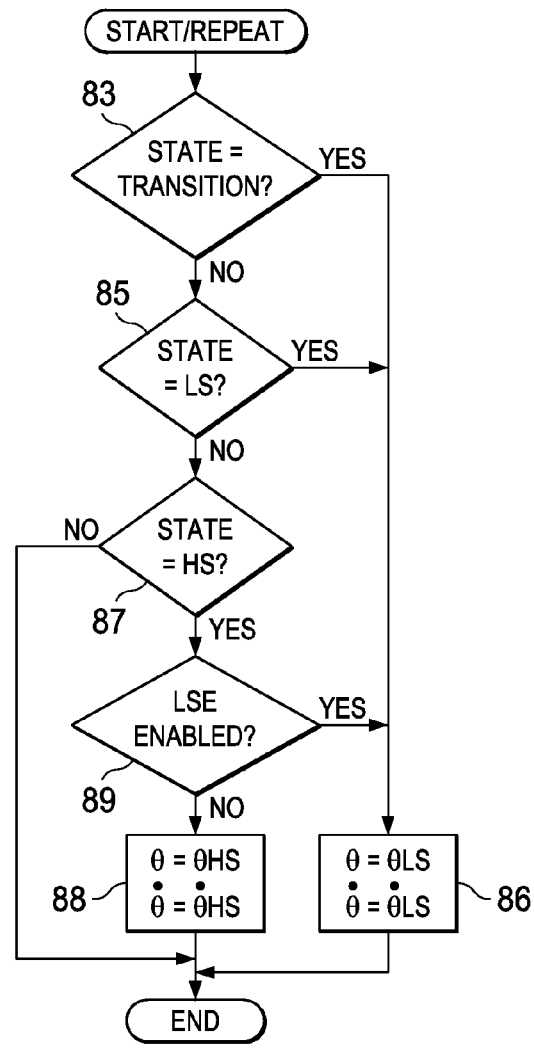

Referring now to FIGS. 7 and 8, the operation of angle/frequency selector function 50 according to an embodiment will now be described, specifically for the operational example in which motor M is started up from zero velocity to a variable high speed operation. FIG. 7 illustrates this operation of sequential logic function 52 in determining the current selection state, and causing enable/disable logic 58 to selectively enable and disable low-speed state estimator 42 and high-speed state estimator 45, while FIG. 8 illustrates the operation of selector function 54 in selecting the pair of low-speed estimates θLS and θ̇LS or high-speed estimates θHS and θ̇HS to be forwarded. While sequential logic function 52 operates as a state machine in this embodiment, the operation illustrated in FIG. 7 is shown in the form of a flow chart for purposes of clarity; it is contemplated that those skilled in the art having reference to this specification will be readily able to arrive at the appropriate sequential logic or instructions for implementing this operation, without undue experimentation. As such, angle/frequency selector function 50 operates according to each of FIGS. 7 and 8, with the flows illustrated in each being repeated (from their "start/repeat" operator) periodically or continually during operation of motor M.

The operation of angle/frequency selector function 50 begins in the "idle" state at startup of the motor, which is identified at decision 59 of FIG. 7. In response to decision 59 returning a "yes" result indicating that the current selection state is "idle", angle/frequency selector function 50 carries out an enable routine in process 60, by way of which each of low-speed state estimator 42 and high-speed state estimator 45 are initialized and enabled. For example, enable routine 60 may be performed by first initializing high-speed estimates θHS and θ̇HS to zero and causing enable logic 58 to issue enable signal HS_EN to high-speed state estimator 45, followed by initializing low-speed estimates θLS and θ̇LS to zero and causing enable logic 58 to issue enable signal LS_EN to low-speed state estimator 42. In this enable routine 60, selector function 54 may also be initialized to set rotor angle estimate θ(n) to select the current value of low-speed rotor angle estimate θLS and to set rotor velocity estimate θ̇(n) to zero. In process 62, sequential logic 52 sets the current selection state to the "LS" state.

The execution of selector function 54 with the current selection state at "LS", as set in process 62, follows the flow of FIG. 8. Decisions 83, 85, 87 are executed to identify whether the current selection state is "transition", "LS", or "HS", respectively. For a current selection state of "LS" (decision 85 returns a "yes" result), selector function 54 is controlled in process 86 to select low-speed angle and velocity estimates θLS and θ̇LS to be forwarded as rotor angle estimate θ(n) and rotor velocity estimate θ̇(n), respectively.

In this example in which the operating speed of motor M is increasing from zero toward a variable high speed operating condition, updating of the selection state is performed by sequential logic 52 identifying the current selection state as "LS" by decision 61 (FIG. 7) returning a "yes" result. Decision 63 is then executed by sequential logic 52 to determine whether the motor speed input signal θ̇ref exceeds a first threshold speed f_STRT. In the arrangement illustrated by way of example in FIG. 6, it is contemplated that this comparison decision 63 (as well as the comparisons with other threshold speeds described herein) will be based on the results of reference signal comparator 56. If decision 63 is "no", indicating that the motor speed input signal θ̇ref does not exceed threshold speed f_STRT, the current selection state remains at "LS", and low-speed angle and velocity estimates θLS and θ̇LS are forwarded as rotor angle estimate θ(n) and rotor velocity estimate θ̇(n), respectively, as before. If motor speed input signal θ̇ref exceeds threshold speed f_STRT, however (decision 63 is "yes"), sequential logic 52 sets the current selection state to "transition" in process 64.

Referring to FIG. 8, the current selection state of "transition" is detected in the execution flow by decision 83 returning a "yes" result. In this embodiment, the "transition" selection state causes selector function 54 to forward low-speed angle and velocity estimates θLS and θ̇ as rotor angle estimate θ(n) and rotor velocity estimate θ̇(n), respectively, in process 86.

In the next iteration of the operation of sequential logic 52, the "transition" selection state is detected by decision 67 returning a "yes" result. Decision 69 is then next executed to compare the motor speed input signal θ̇ref to a second threshold speed f_STP. This threshold speed f_STP is higher than threshold speed f_STRT, and is selected to serve as an upper bound of the transition region from low-speed operation to high-speed operation. If motor speed input signal θ̇ref does not exceed second threshold speed f_STP (decision 69 is "no"), sequential logic 52 sets the current selection state to "LS" again, in process 66, and selector function 54 is again controlled in process 86 (FIG. 8) to forward low-speed angle and velocity estimates θLS and θ̇LS as rotor angle estimate θ(n) and rotor velocity estimate θ̇(n), respectively. On the other hand, if motor speed input signal θ̇ref does exceed second threshold speed f_STP (decision 69 is "yes"), sequential logic 52 sets the current selection state to "HS" in process 68.

Referring to the execution flow of FIG. 8, a current selection state of "HS" is detected by decision 87 returning a "yes" result. According to this embodiment, in this event, decision 89 is executed by angle/frequency selector function 50 to determine whether low-speed state estimator 42 is enabled. If so, selector function 54 is controlled to forward low-speed angle and velocity estimates θLS and θ̇LS as rotor angle estimate θ(n) and rotor velocity estimate θ̇(n), respectively, in process 86, even in this "HS" selection state. If low-speed state estimator 42 is not enabled, however (decision 89 is "no"), selector function 54 is controlled to forward high-speed angle and velocity estimates θHS and θ̇HS as rotor angle estimate θ(n) and rotor velocity estimate θ̇(n), respectively, in process 88.

In the next state selection iteration, the "HS" selection state is indicated by decision 65 (FIG. 7) returning a "yes" decision. In that event, sequential logic 52 next determines whether motor speed input signal θ̇ref exceeds a third threshold speed f_MAX, in decision 71. Threshold speed f_MAX is higher than second threshold speed f_STP in this embodiment. If so (decision 71 is "yes"), process 70 is then executed to disable low-speed state estimator 42; the current selection state remains "HS" in this event. As discussed immediately above, this disabling of low-speed state estimator 42 causes selector function 54 to forward high-speed angle and velocity estimates θHS and θ̇HS as rotor angle estimate θ(n) and rotor velocity estimate θ̇(n), respectively, in process 88 (FIG. 8). If motor speed input signal θ̇ref does not exceed third threshold speed f_MAX (decision 71 is "no"), decision 73 then determines whether low-speed state estimator 42 is enabled. If not (decision 73 is "no"), low-speed state estimator 42 has its low-speed angle and velocity estimates θLS and θ̇LS "seeded" with the current values of the high-speed angle and velocity estimates θHS and θ̇HS in process 74, and low-speed state estimator 42 is then enabled in process 76. The "HS" selection state is retained in this event, and as such selector function 54 will be controlled to forward low-speed angle and velocity estimates θLS and θ̇LS (having been seeded with the current high-speed estimates) in the next instance of process 88 (FIG. 8).

On the other hand, if low-speed state estimator 42 is already enabled, decision 77 is executed to determine whether motor speed input signal θ̇ref has fallen below threshold speed f_STP. If not (decision 77 returns a "no"), the current selection state remains "HS". If so (decision 77 returns a "yes"), the current selection state is set to "transition" in process 78.

Figure 9:
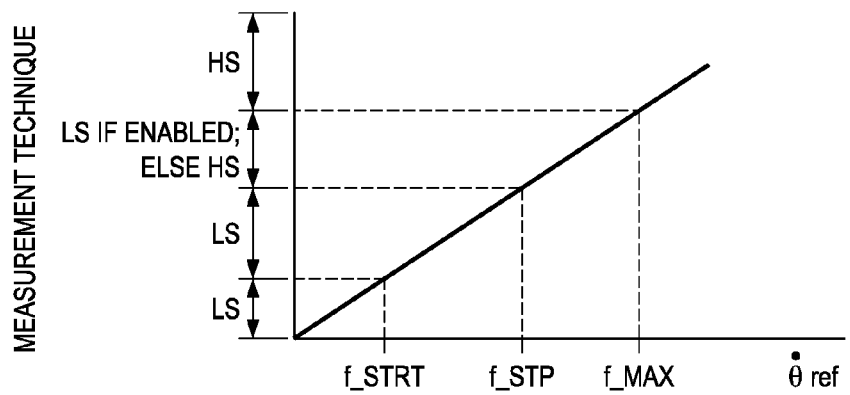
FIG. 9 is a plot of voltage versus operating condition illustrating results of the operation shown in FIGS. 7 and 8, according to that embodiment.

According to this embodiment, the estimates of rotor angle and rotor velocity produced by low-speed state estimator 42, for example based upon an injection signal, and by high-speed state estimator 45, for example based on back emf in the stator windings, are used in the motor control loop in different operating regimes. Angle/frequency selector function 50 in this embodiment provides a control algorithm that smoothly selects between the estimates from those two functions over the entire range from zero speed to the rated speed of the motor being controlled. FIG. 9 illustrates this operation by way of a plot of motor speed input signal θ̇ref versus the selected measurement technique. As shown in FIG. 9, the low-speed angle and velocity estimates θLS and θ̇LS are selected for values of motor speed input signal θ̇ref ranging from zero to threshold speed f_STP, and high-speed angle and velocity estimates θHS and θ̇HS are selected for values of motor speed input signal θ̇ref above threshold speed f_MAX. For values of motor speed input signal θ̇ref between threshold speed f_STP and threshold speed f_MAX, the low-speed angle and velocity estimates θLS and θ̇LS are selected if low-speed state estimator 42 is enabled, and high-speed angle and velocity estimates θHS and θ̇HS are selected if not. The particular values of threshold speeds f_STP, f_STRT, and f_MAX will depend on the rated speed of motor M being controlled, and the inertia and load of the rotor and load, as well as the desired control function; these values may be hard-coded into signal comparator 56, or alternatively may be programmable levels, as desired.

Other factors facilitate the smooth transition of control between the low-speed and high-speed estimates. One such factor is the "seeding" of the low-speed estimates with the current high-speed estimates upon re-enabling of the low-speed state estimator, for example as shown by process 74 of FIG. 7. This re-seeding eliminates a spike or discontinuity that could occur upon enabling of the low-speed state estimator 42.

As evident from the foregoing description, the selection state decisions are based on a comparison of motor speed input signal $\dot{\theta}$ref to the various threshold speeds f_STRT, f_STP, f_MAX. Alternatively, it is contemplated that the current selected rotor velocity estimate $\dot{\theta}(n)$ could be compared against the thresholds by signal comparator 56. However, it is contemplated that comparison of the motor speed input signal $\dot{\theta}$ref to these thresholds will result in smoother control transitions, considering that this motor speed input signal $\dot{\theta}$ref is typically generated by an external trajectory generator function, which is designed to smoothly modulate the reference speed command over the desired range.

As evident from the foregoing description, this embodiment operates by selecting one or the other of the low-speed angle and velocity estimates θLS and $\dot{\theta}$LS or high-speed angle and velocity estimates θHS and $\dot{\theta}$HS for use as rotor angle estimate θ(n) and rotor velocity estimate $\dot{\theta}(n)$, respectively. This selection results in a computationally efficient control approach, as compared with control methods in which a weighting function or other computation involving both the low- and high-speed estimates is used as the control estimates.

While one or more embodiments have been described in this specification, it is of course contemplated that modifications of, and alternatives to, these embodiments, such modifications and alternatives capable of obtaining one or more the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A controller for a rotating AC electric machine, comprising:
    drive circuitry, for driving a multiphase electric machine responsive to at least one control signal;
    feedback circuitry for producing feedback signals responsive to electrical values received from at least one sensor at the machine;
    a control loop for producing the at least one control signal to the drive circuitry responsive to a feedback velocity signal and to an input reference signal;
    a low speed state estimator function for estimating a low speed velocity of the machine from the feedback signals;
    a high speed state estimator for estimating a high speed velocity of the machine from the feedback signals; and
    an angle/frequency selector function, having inputs receiving the low speed and high speed velocity estimates and receiving the input reference signal, and having an output for presenting the feedback velocity signal to the control loop, comprising:
        sequential logic for determining a selection state responsive to a previous selection state and to the input reference signal; and
        a selector function for producing the feedback velocity signal corresponding to a selected one of either the high speed velocity estimate or the low speed velocity estimate, the selection made responsive to the selection state determined by the sequential logic;
        a comparator function for comparing the input reference signal to at least one limit;
        and wherein the sequential logic operates to determine the selection state by:
            detecting the previous selection state;
            determining the current selection state according to the previous selection state and a result from the comparator function;
        wherein the sequential logic determines the current selection state from among a plurality of selection states comprising a low-speed state, a high-speed state, and at least one transition state;
        and wherein the sequential logic performs the determining by executing a plurality of operations comprising:
            responsive to the previous selection state being the low-speed state and to the input reference signal being above a start limit, determining the current selection state as a transition state;
            responsive to the previous selection state being the high-speed state and to the input reference signal being below a stop limit, determining the current selection state as a transition state;
            responsive to the previous selection state being a first transition state and to the input reference signal being below the stop limit, determining the current selection state as the low-speed state.

2. The controller of claim 1, wherein the selector selects the low speed velocity estimate responsive to the current selection state being the transition state.

3. The controller of claim 1, wherein the plurality of operations further comprises:
    responsive to the previous selection state being the transition state and to the input reference signal being above the stop limit, determining the current selection state as the high-speed state.

4. The controller of claim 1, wherein the selector selects the low-speed velocity signal responsive to the current selection state being the high-speed state in combination with the input reference signal being below a max limit;
    and wherein the selector selects the high-speed velocity signal responsive to the current selection state being the high-speed state in combination with the input reference signal being above the max limit.

5. The controller of claim 4, wherein the controller function further comprises:
    logic for disabling the low-speed state estimator function responsive to the current selection state being the high-speed state in combination with the input reference signal being above the max limit.

6. A method of controlling the operation of a rotating AC machine, comprising:
    driving the electric machine responsive to a control signal;
    producing feedback signals responsive to sensed rotation of the machine;
    generating the control signal by:
        determining a current selection state;
        responsive to the determined state being a low-speed state:
            estimating a low-speed velocity from the feedback signals; and producing the control signal by executing a control function on the estimated low-speed velocity and an input reference signal;

responsive to the determined state being a high-speed state:

estimating a high-speed velocity from the feedback signals; and producing the control signal by executing a control function on the estimated low-speed velocity and an input reference signal;

wherein the determining step comprises:
detecting a previous selection state;
comparing the input reference signal to at least one limit;

executing sequential logic to determine the current selection state according to the previous selection state and to the result of the comparing step;

wherein the determining step determines the current selection state from among a plurality of states comprising the low-speed state, the high-speed state, and at least one transition state;

and wherein the executing step comprises:
responsive to the previous selection state being the low-speed state and to the input reference signal being above a start limit, determining the current selection state as the transition state;

responsive to the previous selection state being the high-speed state and to the input reference signal being below a stop limit, determining the current selection state as the transition state;

responsive to the previous selection state being the transition state and to the input reference signal being below the stop limit, determining the current selection state as the low-speed state.

7. The method of claim 6, wherein the generating step further comprises:

responsive to the determined state being the transition state:

estimating the low-speed velocity from the feedback signals; and producing the control signal by executing a control function on the estimated low-speed velocity and the input reference signal.

8. The method of claim 6, wherein the executing step further comprises:

responsive to the previous selection state being the transition state and to the input reference signal being above the stop limit, determining the current selection state as the high-speed state.

9. The method of claim 6, wherein the comparing step compares the input reference signal to a max limit;

wherein the generating step further comprises:
selectively forwarding either the estimated low-speed velocity or the estimated high-speed velocity to the control function responsive to the determined state and to the result of the comparing step;

wherein the forwarding step forwards the estimated low-speed velocity responsive to the determined state being the high-speed state in combination with the input reference signal being below the max limit;

and wherein the forwarding step forwards the estimated high-speed velocity responsive to the determined state being the high-speed state in combination with the input reference signal being above the max limit.

10. The method of claim 9, further comprising:
disabling the step of estimating low-speed velocity responsive to the determined state being the high-speed state in combination with the input reference signal being above the max limit.

* * * * *

UNITED STATES PATENT AND TRADEMARK OFFICE
CERTIFICATE OF CORRECTION

Page 1 of 1

PATENT NO. : 9,548,686 B2
APPLICATION NO. : 14/337576
DATED : January 17, 2017
INVENTOR(S) : David Patrick Magee It is certified that error appears in the above-identified patent and that said Letters Patent is hereby corrected as shown below:

On the Title Page

Related U.S. Application Data

Please ADD the Priority Data to reflect the following:
-- CIP of application No. 14/245,206 filed on April 04, 2014, now Pat. No. 9,270,220. Provisional application No. 61/881,714, filed on Sept 24, 2013, Provisional application No. 61/881,730 filed on Sept 24, 2013, and Provisional application No. 61/819,267 filed on May 3, 2013. --

Signed and Sealed this
Fifth Day of September, 2017

Joseph Matal
*Performing the Functions and Duties of the*
*Under Secretary of Commerce for Intellectual Property and*
*Director of the United States Patent and Trademark Office*